United States Patent
Corbellini et al.

(10) Patent No.: US 8,995,270 B2
(45) Date of Patent: Mar. 31, 2015

(54) ASYNCHRONOUS COMMUNICATION METHOD FOR A WIRELESS SENSOR NETWORK

(75) Inventors: Giorgio Corbellini, Grenoble (FR); Emilio Calvanese Strinati, Grenoble (FR)

(73) Assignee: Commissariat à l'énergieatomique et aux énergies alternatives, Paris (FR)

( * ) Notice: Subject to any disclaimer, the term of this patent is extended or adjusted under 35 U.S.C. 154(b) by 632 days.

(21) Appl. No.: 13/369,702

(22) Filed: Feb. 9, 2012

(65) Prior Publication Data
US 2012/0207062 A1  Aug. 16, 2012

(30) Foreign Application Priority Data
Feb. 10, 2011  (FR) ................. 11 51064

(51) Int. Cl.
*H04J 1/16* (2006.01)
*H04W 74/08* (2009.01)
*H04W 52/02* (2009.01)
*H04W 84/18* (2009.01)

(52) U.S. Cl.
CPC .............. *H04W 74/08* (2013.01); *H04W 52/02* (2013.01); *H04W 84/18* (2013.01)
USPC ........................................ 370/235; 370/256

(58) Field of Classification Search
CPC ...... H04W 84/18; H04W 74/08; H04W 52/02
USPC ................................................. 370/235, 256
See application file for complete search history.

(56) References Cited

U.S. PATENT DOCUMENTS

| 2006/0285579 A1* | 12/2006 | Rhee et al. ........... 375/132 |
| 2007/0207750 A1 | 9/2007 | Brown et al. |
| 2009/0103437 A1* | 4/2009 | Kim et al. ............ 370/235 |
| 2012/0033584 A1* | 2/2012 | Corroy ................. 370/254 |

FOREIGN PATENT DOCUMENTS

WO  WO 2009/036786 A1  3/2009

OTHER PUBLICATIONS

European Search Report issued May 2, 2012 in Patent Application No. EP 12 15 4389.
Joseph Polastre, et al., "Versatile Low Power Media Access for Wireless Sensor Networks" SenSys '04, Nov. 3-5, 2004, pp. 95-107.

(Continued)

*Primary Examiner* — Sai-Ming Chan
(74) *Attorney, Agent, or Firm* — Oblon, McClelland, Maier & Neustadt, L.L.P.

(57) ABSTRACT

The present invention relates to an asynchronous communication method in a wireless sensor network comprising a tree structure. For each node of the network, the communication is organized as a sequence of time frames, each frame including a listening phase possibly followed by a receiving phase and/or a transmitting phase. The method, of the preamble sampling type, enables a node to make a time appointment to its child node to transmit them a time window allocation message, each child node then transmitting at least one data packet in the window it has been allocated to. By minimizing the collision risk between packets and by maximizing the time during which the sensors go to sleep, the communication method both reduces the latency and the consumption within the network.

17 Claims, 8 Drawing Sheets

(56) References Cited

OTHER PUBLICATIONS

Marco Avvenuti, et al., "Increasing the Efficiency of Preamble Sampling Protocols for Wireless Sensor Networks" SensoreNet Project, 2006, pp. 1-6.

Michael Buettner, et al., "X-MAC: A Short Preamble MAC Protocol for Duty-Cycled Wireless Sensor Networks" SenSys '06, Nov. 1-3, 2006, 14 pages.

* cited by examiner

| next hop MAC address | source MAC address | priority level | transmission request code |

| next hop MAC address | source MAC address | priority level | rdv relative time | ack code |

ASYNCHRONOUS COMMUNICATION METHOD FOR A WIRELESS SENSOR NETWORK

TECHNICAL FIELD

The present invention generally relates to the field of wireless sensor networks (WSN), and more particularly those operating in asynchronous mode.

STATE OF PRIOR ART

Wireless sensor networks are used in a wide range of applications, in particular for environmental monitoring, industrial process monitoring, home automation monitoring, road traffic monitoring, precision agriculture, intrusion detection, etc.

Generally, a wireless sensor network is an ad hoc network the nodes of which consist of sensors capable of transmitting measures autonomously. Each sensor can transmit its measures systematically, for example at a determined periodicity or, if it is provided with a local intelligence, selectively, for example upon detection of an anomaly. Data of the measures are then transmitted as packets to a collecting node, also called data sink which centralizes part or all of the measures in question and possibly processes them. The measure data packets are routed to the collecting node thanks to a multi-hop routing within the network. In other words, a network node generally has both a relay function in addition to a measurement function.

FIG. 1A schematically represents a wireless sensor network including a single collecting node 101. Measure data packets are routed, and more precisely relayed, through the nodes 110 and 111 to the collecting nodes. It is noted that the network has a tree structure, the leaves of the tree 112 having exclusively a measurement function and the nodes 110, 111 can hold concurrently a measurement function and a relay function. It will be understood that a packet data from any node of the tree will thus be transmitted step by step up to the collecting node, at the root of the tree. Except the leaves and the root of the tree, each node 110, has a parent node 111, and one or more child nodes 112. Thus, any node 110 transmits to its parent node the packets it receives from its child nodes as well as its own packets. The child nodes of a same node, called brother nodes, are competing to transmit their data packets (own data or relayed data) to their parent node.

For a given node, by related nodes, it would be meant its parent node, its child nodes and its brother nodes. The neighbour node of a given node, other than the related nodes, are called interfering nodes 140. By neighbour node of a given node, it is intended any node of the network, whose signal power received at the node in question is higher than a predetermined threshold. In practice, in the case of a homogeneous network where the nodes have the same transmission power, the neighbours of a node are located inside a circle centred on this node.

FIG. 1B schematically represents a wireless sensor network including a plurality of collecting nodes. At each collecting node can be associated a sub-network of the sensor network, with a tree structure, the root of which is the collecting node in question.

The example illustrated in FIG. 1B comprises two collecting nodes 101 and 102 associated to the sub-network represented in FIGS. 2A and 2B respectively. It will be understood that a node of a network can be the parent of another node in a first sub-network whereas it will be the child of the same other node in a second sub-network. Filiation relationships between two nodes are thus relating to the collection node being considered. On the other hand, for a given collecting node, any node of the sub-network associated to this collecting node has one and single parent node.

The sensor network nodes are generally mobile and the propagation conditions of a transmission channel between a node and its parent can consequently vary over time. Moreover, the filiation relationships between nodes can also change depending on movements of the different nodes.

Wireless sensor networks are discriminated between the homogeneous type and the heterogeneous type. In an homogeneous type network, all the sensors have the same physical characteristics, in particular the same transmission power, the same transmission rate, etc. Conversely, in a heterogeneous type wireless sensor network, each sensor can have different characteristics, possibly likely to vary over time. For example, a sensor could transmit monitoring information at a low rate (long interval between successive transmissions of the measure data) and alert information at a high rate (burst of alert messages).

Finally, the wireless sensor networks are discriminated between the synchronous type and the asynchronous type. In a network operating in a synchronous mode, the nodes of the network share the access to a transmission resource according to a common time division, that is during time intervals (TTI) known to all the nodes of the network. On the other hand, in an asynchronous type network, the different nodes are not synchronized between each other, often because a preliminary synchronization step is hardly conceivable, or even impossible, between mobile nodes. More complex communication protocols should thus be resorted to, to asynchronously access to a common transmission resource.

Communication protocols allowing access to a transmission channel, more precisely to a transmission resource, in a wireless sensor network are also called MAC protocols referring to the MAC sublayer of the link layer in such a network.

Several types of MAC protocols are known from the state of the art.

The B-MAC protocol is an asynchronous access protocol using a preamble sampling technique from the LPL (Low Power Listening) protocol. A description of the B-MAC protocol is found in the article of J. Polastre et al. untitled "Versatile low power media access for wireless sensor networks" published in *Proc. of the $2^{nd}$ International Conference on Embedded networked sensor systems*, Baltimore, USA, 2004, pp. 95-107. In the B-MAC protocol, each node of the sensor network asynchronously operates and periodically goes through successive states: wake-up, channel listening and sleep. The interval between two successive wake-ups is identical regardless of the node and besides represents the only information shared by all the nodes of the network. When a first node wishes to transmit a data packet to a second node, the first node transmits a preamble, with a period higher than the interval between two successive wake-ups (wake-up period) so as to make sure that the second node is able to detect it. At the end of the preamble, the first node immediately transmits the payload. Since the second node has been informed by the preamble, it keeps listening to the channel until the packet is fully received.

The advantage of the B-MAC protocol is not to require a preliminary synchronization of the network nodes. The transmission of a long preamble can however result in a long latency time as well as a high energy consumption, hardly compatible with a stand-alone power supply to the sensors. Moreover, when the network is relatively dense, the collision risk between preambles of different nodes is high, which decreases all the more the effective rate on the network.

An improved alternative of the B-MAC protocol, called B-MAC+ has been provided in the article of M. Avvenuti et al. entitled "Increasing the efficiency of preamble sampling protocols for Wireless sensor networks" published in *Mobile Computing and Wireless Communication International Conference*, 2006, pp. 1-6. In this alternative, the preamble is divided into several sections, each section having an indication of the size of the preamble part still to be transmitted. Thus, when the recipient node detects a preamble, it can determine the end thereof and go to sleep until the payload of the packet is received. Even though the B-MAC+ protocol enables the energy consumption of the nodes to be reduced, the latency times are as long as in the B-MAC protocol. Moreover, the collision risk between preambles are still as high.

To reduce both the latency time and energy consumption, it has been suggested to replace the long preamble, intended to wake-up the recipient node, by a train of short preambles the total length of which is that of the long preamble, each of the short preambles containing the address of the recipient node. As soon as the recipient node detects a short preamble, the latter sends back an acknowledgment signal (early ACK) to the origination node. Upon reception of this acknowledgment signal, the origination node immediately stops sending short preambles and transmits the payload of the packet. This protocol known as X-MAC has been introduced by M. Buettner et al. in the article "X-MAC: a short preamble MAC protocol for duty-cycled wireless sensor networks" published in *Proc. of the 4th International conference on Embedded sensor systems*, 2006, pp. 307-320.

FIG. 3 illustrates an exemplary implementation of the X-MAC protocol in a wireless sensor network. It is represented in 310 the time chart relating to a first origination node wishing to transmit a data packet to a recipient node, and in 320 the time chart relating to this recipient node. The first origination node transmits a train of short preambles 311. In 321, the recipient node wakes-up at a given instant (its wake-up is scheduled at regular intervals) and detects a short preamble containing its address in 322. It immediately sends back in 323 a detection acknowledgment received by the first origination node in 313. The latter then stops transmitting the train of preambles and sends the data packet 314. The packet is received by the recipient node in 324.

If it is assumed now that a second origination node also wishes to transmit a data packet to the same recipient (for example, the first and second nodes are child nodes of the recipient node), there can be a collision between the train of preambles originated from this second node with data originated from the first node, given that both nodes asynchronously operate. In this case, the recipient node receives an erroneous packet.

The object of the present invention is accordingly to provide an asynchronous communication method in a wireless sensor network, reducing the collision risk between packets while ensuring a low energy consumption of nodes of the network.

DESCRIPTION OF THE INVENTION

The present invention is defined by an asynchronous communication method for a wireless sensor network, the network further comprising at least one tree structure the nodes of which consist of said sensors and the root of which consists of a collecting node, each node being adapted to receive data packets from its child nodes and to transmit them to its parent node within said tree structure, the transmission of a packet by a node being preceded by the transmission of a preamble consisting of a train of unit preambles, called short preambles, the communication of each node being organized according to a sequence of time frames, each time frame comprising a listening phase possibly followed by a receiving phase and/or a transmitting phase, wherein said node:

determines during the listening phase whether a preamble is transmitted to it by one of its child nodes and, if yes, immediately sends back to the same an acknowledgment message specifying a rendezvous time;

at the end of the listening phase, if at least one acknowledgment message has been sent, enters a receiving phase wherein it broadcasts, at the rendezvous time, a message for allocating time windows to its child nodes, and then receives, during each time window, a data packet of the child node to which this window has been allocated.

Advantageously, if no acknowledgment message has been sent during the listening phase, a node determines whether data packets are present in its transmitting buffer and:

if yes, transmits to its parent node a preamble consisting of a train of short preambles;

if no, goes to sleep for the rest of the time frame.

Preferably, following the transmission of each short preamble, the node waits for an acknowledgment message from its parent node and:

if it receives such an acknowledgment message, immediately terminates the transmission of the train of short preambles, extracts from this acknowledgment message a time information indicating a rendezvous time and then goes to sleep until this time;

if it does not receive any acknowledgment message at the end of the train of short preambles, goes to sleep until the end of the time frame.

According to an advantageous alternative, at the rendezvous time, the node detects a time window allocation message originated from its parent node, determines whether this message contains its own MAC address and:

if yes, extracts a start information and an end time information of its allocated time window, goes to sleep until the start of this window and transmits at least a data packet stored in its transmitting buffer during this window;

if no, goes to sleep until the end of the time frame.

At the end of its allocated time window, the node advantageously goes to sleep until the end of the time frame.

According to one alternative embodiment, at the end of the receiving phase, the node checks whether its parent node is busy and:

if no, transmits a train of short preambles to it and waits for an acknowledgment message from its parent node;

if yes, goes to sleep until the end of the time frame.

If the node receives an acknowledgment message, the same:

terminates the transmission of the train of short preambles, extracts from this acknowledgment message a time information indicating a rendezvous time and then goes to sleep until this time;

detects, at the rendezvous time, a message for allocating time windows originated from its parent node, determines whether this message contains its own MAC address and, if yes, extracts a start time information and an end time information of its allocated time window, goes to sleep until the start of this window and transmits to its parent node at least one data packet it has received from its child nodes during the previous receiving phase.

According to yet another alternative embodiment, the time frame allocation at different child nodes is performed based on priority levels specified in preambles originated from its different child nodes respectively.

In this case, the priority level can be expressed in terms of class of service type, whether a child node is mobile or not, number of packets in the transmitting buffer of a child node or even oldness of the oldest packet in this transmitting buffer.

The time information specifying the rendezvous time can be a counter value to be decremented with a predetermined frequency.

Moreover, the start time information and the end time information of the time window allocated to the node can be counter values to be decremented with a predetermined frequency.

Advantageously, when a node detects a message from its parent node during the listening phase, it terminates any transmission and goes to sleep until the end of the current time frame.

Similarly, when a first node detects, during the listening phase, a preamble originated from a second node having the same parent node as the first node, said first node itself transmits a preamble, without waiting for the transmitting phase, with the proviso that packets are in standby in its transmitting buffer.

If a node detects, during the listening phase, a packet, other than a preamble, from one of its child nodes, it switches off the listening phase and either goes to sleep until the end of the current time frame, or directly switches to the transmitting phase.

If a node detects, during a transmitting phase, a preamble of its parent node whereas it is waiting for an acknowledgment message from the same node, it goes to sleep until the end of the current time frame.

If a first node detects, during a transmitting phase, a preamble originated from a second node having the same parent node as the first node, said first node decides to switch off the transmission of its preamble if its priority level is lower than that of the preamble originated from the second node and continues to transmit its preamble in the opposite case.

Finally, if a node detects a preamble or a time window allocation message, from a child node, during a receiving or transmitting phase, it does not go to sleep and waits for the transmission of a packet of this child node.

BRIEF DESCRIPTION OF THE DRAWINGS

Further characteristics and advantages of the invention will appear upon reading a preferential embodiment of the invention made in reference to the appended figures wherein.

DETAILED DESCRIPTION OF PARTICULAR EMBODIMENTS

In the following, a wireless sensor network including at least one data sink, also called collecting node will be considered again. The sensors and data sinks are identified to nodes of the network.

Without loss of generality, it will be assumed that the network is of the single sink type, that is it is organized according to a tree structure with a collecting node at the root of the tree. If the network includes a plurality of data sinks, it can be decomposed into several sub-networks associated to different sinks respectively, each sub-network having a tree structure. The communication method according to the invention then operates on each sub-network in parallel.

Figures 1A, 1B:
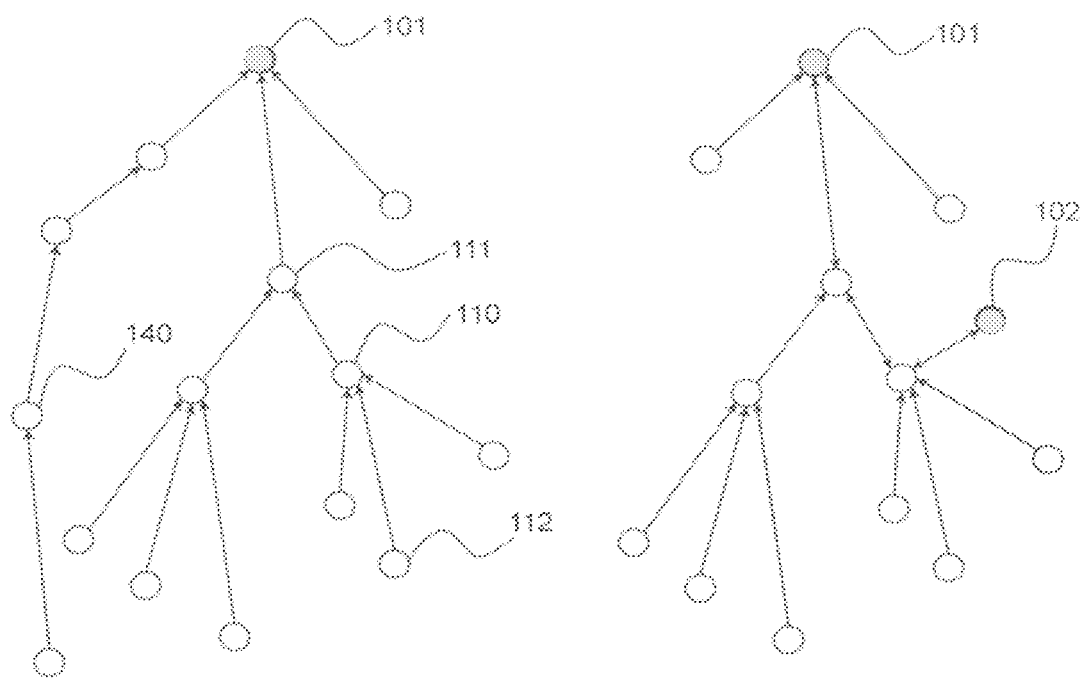
FIGS. 1A and 1B schematically represent two exemplary wireless sensor networks.
Figure 2A:
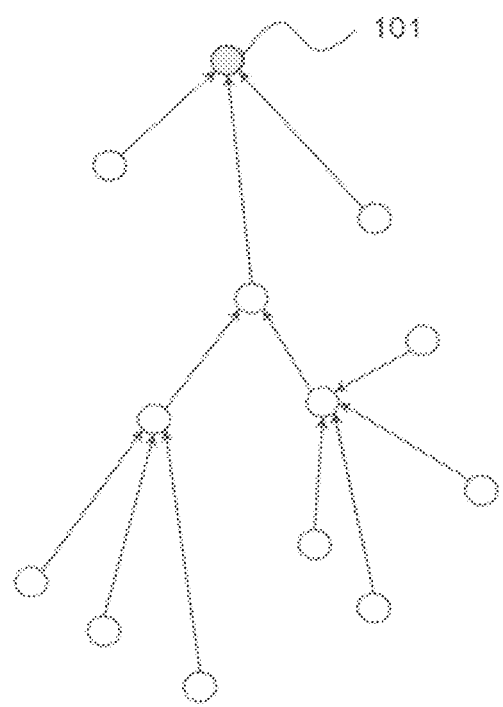
FIGS. 2A and 2B represent sub-networks associated to two collecting nodes of FIG. 1B respectively.
Figure 2B:
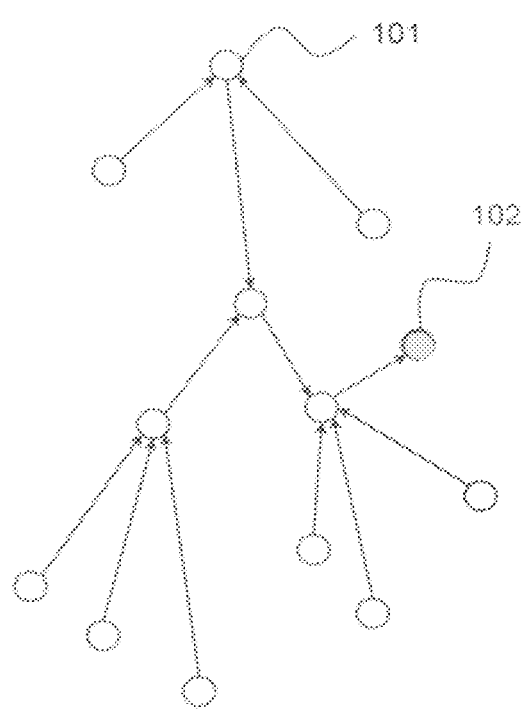
Figure 3:
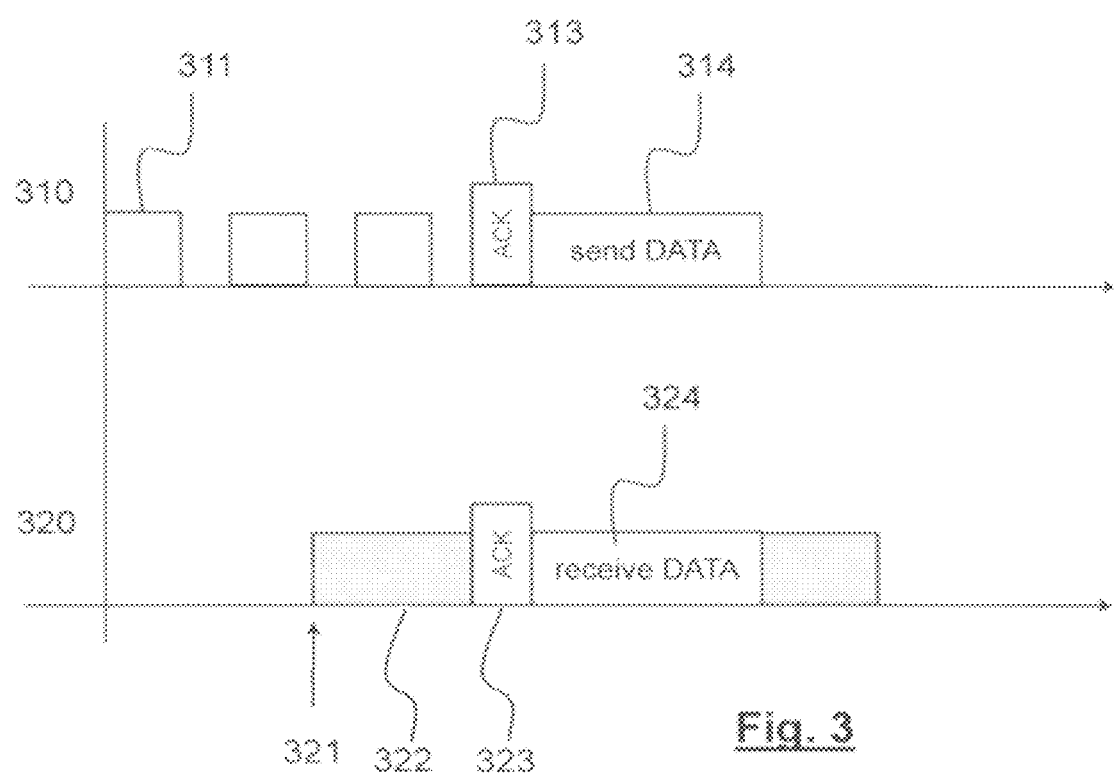
FIG. 3 illustrates one exemplary implementation of the X-MAC protocol in a wireless sensor network.
Figure 4:
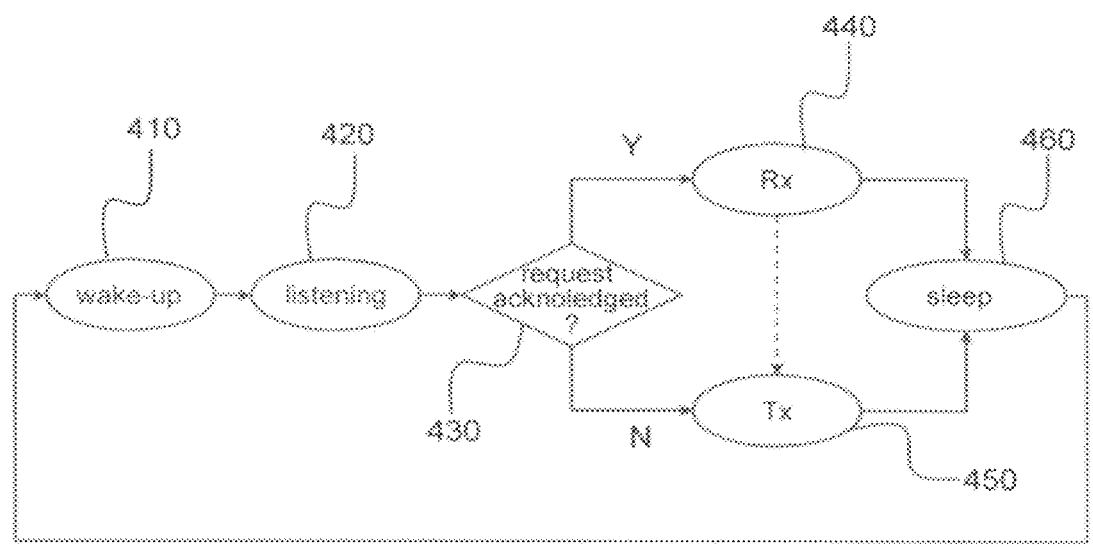
FIG. 4 represents a simplified state diagram of a node of the network implementing the communication method according to one embodiment of the invention.

FIG. 4 gives a simplified state diagram of a network node using the communication method according to one embodiment of the invention.

It will be considered herein a generic node of the network, in other words a node which is neither located at the root (collecting node) nor at a leave of the tree.

Each node of the network cyclically goes through a sequence of states, wherein some states can be optional (represented in broken line) and other obligatory (represented in solid line).

Each node of the network wakes up at regular intervals, the wake-up phase being represented by state 410. In practice, the switching to state 410 results in the activation of the radio receiver within the node.

The node then goes to a channel listening state 420 for a predetermined period. By channel listening, it is meant that the receiver receives and analyses the transmission channel signals. The transmission channel is to be understood herein in its general sense: it encompasses both the transmission channel between the node in question and its parent nodes as well as the transmission channel(s) between this same node and its child node(s), wherein the receiver cannot a priori distinguish these different channels using different transmission resources.

At the end of the listening phase, the node can go either to a receiving phase 440, if it has acknowledged beforehand a transmission request, also called hereinafter allocation request, or a transmitting step 450, provided that it has itself data packets to be transmitted (own data packets and/or data packets to be relayed). More precisely, at the end of the listening phase 420, the node checks in 430 whether it has acknowledged a transmission request of at least one of its child node. If yes, it goes to step 440 and, if no, it goes to step 450.

According to an alternative which is considered hereinafter, the node can go under some conditions to the transmitting phase 450 at the end of the receiving phase 440.

In any case, the node then goes to sleep in 460 before waking up again at the start of the next time frame in 410.

Figure 5:
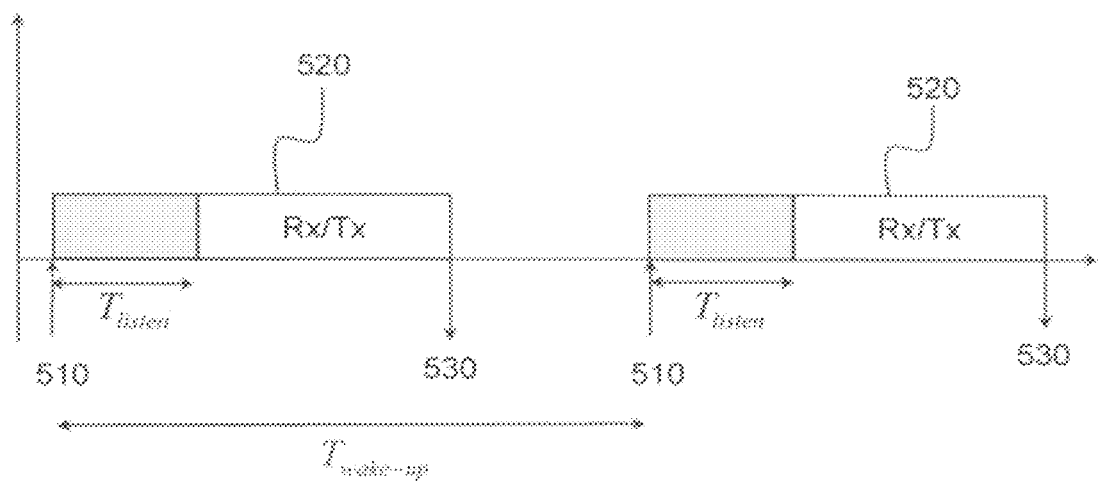
FIG. 5 represents the time frame of the communication method according to one embodiment of the invention.

FIG. 5 represents a basic time frame used by the communication method according to the invention. This frame is repeated according to period $T_{wake-up}$, identical for all the nodes of the network. The frame sequences are however arbitrarily shifted from one node to another (asynchronous nodes).

The time frame starts with a wake-up of the node 510, immediately followed by a listening phase 520 of a period $T_{listen}$. If the node has acknowledged transmission requests during the listening phase, it goes to a receiving phase. The node initiates the reception by transmitting a scheduling message to its child nodes as it will be seen later. In the absence of acknowledgment, if the node itself has packets to be transmitted (whether own or relayed) to its parent node, the listening phase is followed by a transmitting phase.

The receiving/transmitting phase is designated by 520. At the end of the phase 520, the node goes to sleep in 530.

Figures 6, 7A, 7B:
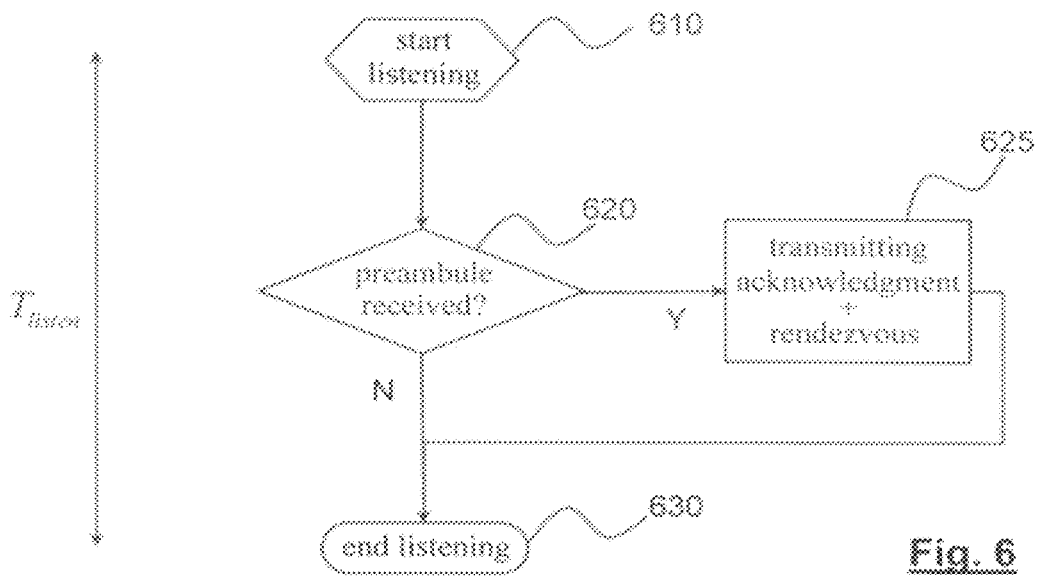
FIG. 6 represents a flowchart of a channel listening phase according to one embodiment of the invention.
FIGS. 7A and 7B show the format of a preamble and the format of an acknowledgment message respectively.

FIG. 6 represents in more detail the flowchart of the listening phase of FIG. 5.

The node starts listening to the transmission channel in step 610, in other words the receiver of the node detects messages received on this channel.

During the entire listening period, the node checks in 620 whether it receives a preamble intended for it. As in the above-mentioned X-MAC protocol, this preamble indeed consists of a train of short preambles. When a node wishes to transmit a data packet to its parent node, it transmits beforehand such a preamble to it to require the allocation of an origination time window. Since each short preamble includes the address of the recipient node of the packet (for example its MAC address), the node can determine whether the preamble and, consequently, the packet that follows it, is actually addressed to it.

As soon as the node receives a short preamble intended for it, it sends backs in 625 an acknowledgment message to the child node that has transmitted it. The acknowledgment message contains time information indicating a rendezvous time, explained herein below.

It should be noted that, during the listening period, the node in question can receive preambles from its different child nodes and therefore transmit several acknowledgment messages intended for them. However, the rendezvous time is the same for all its child nodes.

Sending an acknowledgment message simply means that the allocation request has well been taken into account by the node having received it. The child node being recipient of the acknowledgment message then stops transmitting its preamble, that is stops transmitting short preambles.

Anyway, the listening phase is terminated in 630 at the end of the time $T_{listen}$.

FIG. 7A represents an exemplary format of a short preamble, such as received in step 620.

The short preamble comprises the MAC address of the recipient node (Next hop MAC address), the MAC address of the source node (Source MAC address) transmitting the preamble, as well as a code specifying a time window allocation request (Transmission request code).

The short preamble can further comprise more information, such as indication giving the packet class of service, the number of packets still to be transmitted by the source node, in other words the number of packets stored in the transmission buffer, the waiting time of the oldest packet in the buffer, etc. Generally, this information represents a priority level for the packet and enables the allocation of time windows to be performed, as described herein below.

FIG. 7B represents an exemplary format of a acknowledgment message such as transmitted in step 625.

The acknowledgment message comprises the MAC address of the recipient node of the acknowledgment message (Next hop MAC address), that is the MAC address of the node having transmitted the preamble, the address of the source node of the acknowledgment message (source MAC address), that is the MAC address of the node having received the preamble, a code specifying an acknowledgment (ack code), possibly an indication of the priority level and a time information specifying a rendezvous time (rdv relative time).

Since nodes are asynchronous, the time information is provided in a relative form, for example as a counter value to be decremented with a predetermined clock frequency. The node receiving the acknowledgment message loads a counter with the value in question. The rendezvous time coincides with the zero crossing of the counter.

Figure 8:
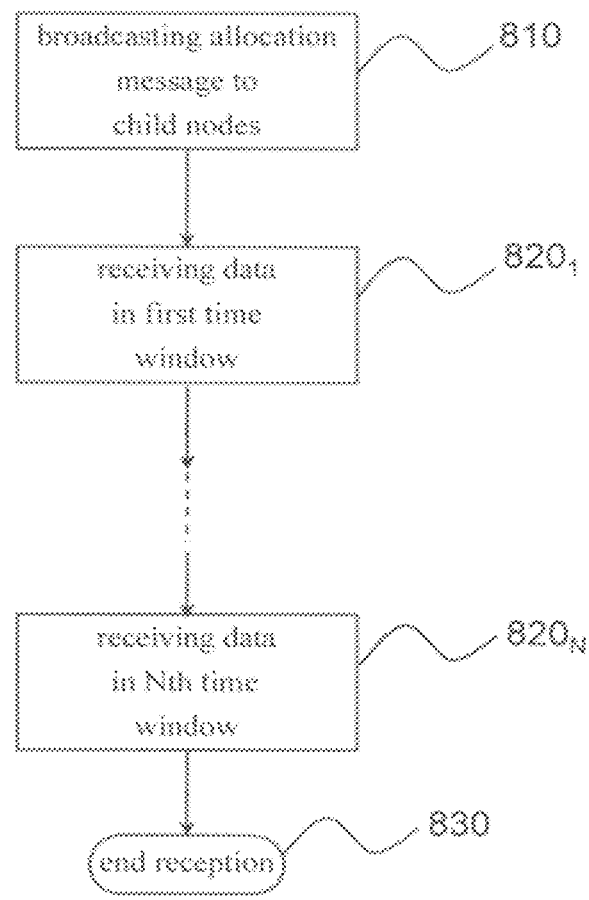
FIG. 8 represents the flowchart of a receiving phase according to one embodiment of the invention.

FIG. 8 represents in more detail the flowchart of the receiving phase of FIG. 5.

This receiving phase allows a node to receive data packets from its child nodes, more precisely from those to which it has transmitted beforehand an acknowledgment message in the previous listening phase (FIG. 6, 625), or even in the listening phase of a previous time frame.

At the rendezvous time set during the listening phase, the node spreads in 810 a time window allocation message to all its child nodes. This message indicates at each of the child nodes having received an acknowledgment message, the time window during which it will be allowed to transmit its data packet.

The time window allocation strategy will be subsequently presented in relation with FIG. 9.

Generally, each time window is relatively defined by a start time information and an end time information. This time information is advantageously counter values. The node to which the window is allocated, called allocated node, decrements these values with a predetermined frequency. Advantageously, the start time information is a zero value, and the end value of a window is identical to the start value of next window. In this way, the allocated node of the first time window starts transmitting upon receiving the allocation message (that is from the rendezvous time) and the allocated nodes of next windows transmit one after the other without interruption.

The node listens to the channel during each time window and recovers the data packets transmitted by its children in $820_1$-$820_N$.

The receiving phase terminates in 830 and the node then goes to sleep. According to an optional alternative embodiment described below, the node attempts to immediately transmit the packets it has just received from its children to its parent.

Figure 9:
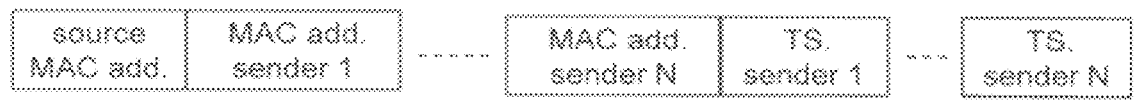
FIG. 9 represents the format of a message for allocating time windows.

FIG. 9 represents an exemplary format of a time window allocation message.

The allocation message comprises the MAC address of the message origination node (Source MAC address), the MAC addresses of the child nodes to which the time windows (MAC address sender 1, . . . , MAC address sender N) are allocated as well as the respective end values of these windows (TS sender 1, . . . , TS Sender N). Thus, the first allocation receiver transmits its data as soon as it receives the allocation message and until the time indicated by TS1, the second allocation receiver then transmits its data from TS1 to TS2, and so forth up to TSN.

The time window allocation is performed according to a strategy depending on the application type.

In some cases, the network can support several traffic types corresponding to several classes of service. For example, a sensor can have to transmit monitoring data with a low urgency or priority level but also alert data with a high priority level. The priority level of the packet can be specified in the preamble (Preamble type) upon the allocation request. This priority level could indicate or depend on the packet class of service, the number of packets in standby in the transmission buffer, the oldness of the oldest packet in the buffer, whether the node is mobile or not, etc.

The time window allocation is made according to the priority level being required. Thus, an urgent packet may be allocated the first time window, whereas a non-urgent packet will only be served if there is still an available window (Best effort). Indeed, the length of the receiving phase being bounded by $T_{wake-up}-T_{listen}$, a child node may not be served, even though its allocation request has been acknowledged at the start of the frame, during the listening phase. In this case, it will have to wait for a subsequent frame to receive an allocation message containing its MAC address.

For a same priority level, the time window allocation may be performed according to first-come-first-served rule. Alternatively, this allocation will be advantageously performed depending on an information contained in the preamble, such as the oldness of the oldest packet in the buffer of the child node or even the number of packets waiting for transmission in this buffer.

Figure 10:
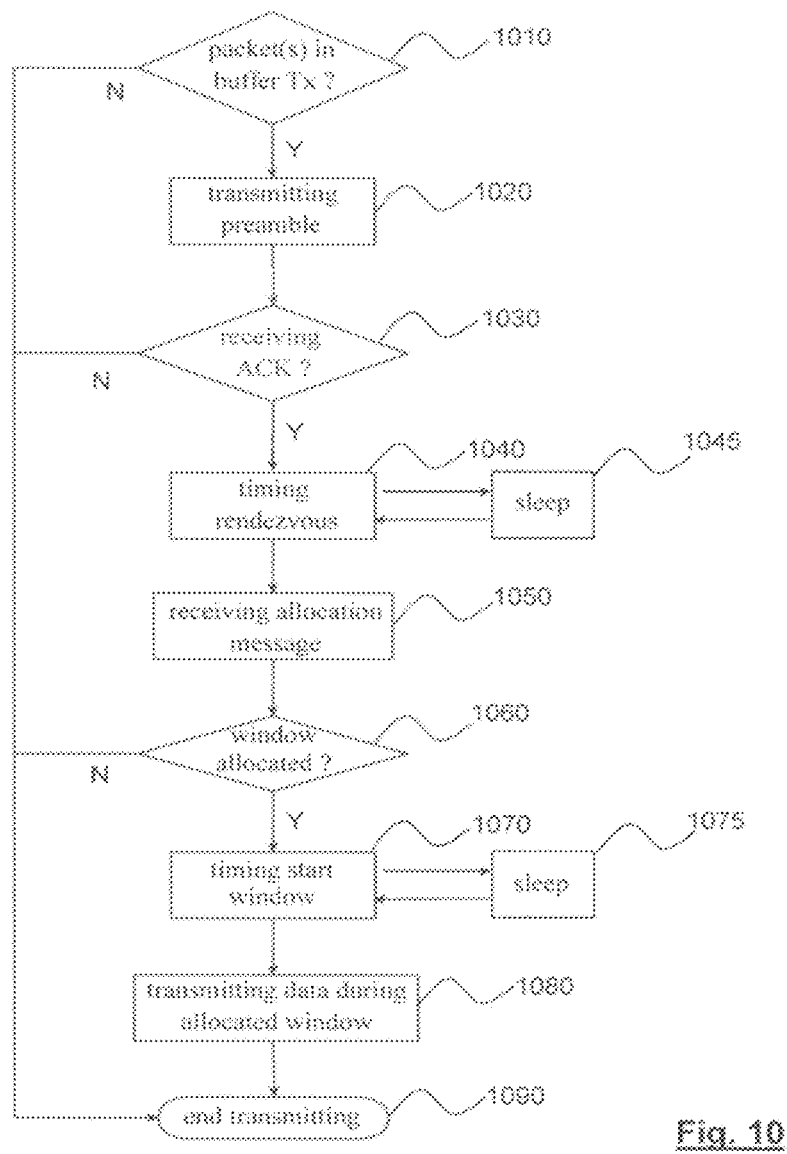
FIG. 10 represents the flowchart of a transmitting phase according to one embodiment of the invention.

FIG. 10 schematically represents the flowchart of the transmitting phase of FIG. 5.

It is reminded that the node goes into this phase if it did not acknowledge the allocation request during the previous listening phase.

The node checks in 1010 the state of its transmission buffer. If the buffer does not contain a packet to be transmitted, the transmitting phase immediately terminates in 1090.

If the buffer contains at least one packet to be transmitted, the node transmits in 1020 a train of short preambles to its parent node. The maximum period of this train of preambles is equal to the longest wake-up period of a node ($T_{wake-up}$). Thus, its parent node can certainly detect its preamble. The format of short preambles is given by FIG. 7A.

After a short preamble is sent, the node checks in 1030 whether it has received an acknowledgment message. The format of the acknowledgment message is given in FIG. 7B.

If the node still does not have received any acknowledgment message at the end of its train of preambles, it terminates the transmitting phase in 1090.

On the other hand, if it receives an acknowledgment message from its parent node, it immediately extracts therefrom the time information giving the rendezvous time and loads a counter with this information in step 1040. In other words, the node sets a timer with a length corresponding to the time information thus extracted and then goes to sleep in 1045.

When the timer expires, the node wakes-up and receives the time window allocation message in 1050.

The node analyses the message in question and determines in 1060 whether it has been allocated a time window, that is whether the message contains its MAC address. If no, the transmitting phase terminates in 1090. If yes, the node extracts in 1070 the time information ($TS_{n-1}, TS_n$) giving the start and the end of its allocated window, respectively. These values are loaded in counters and decremented with a predetermined frequency.

The node can wait for the start of the window by remaining in an awakening state. Alternatively, as for the allocation message, it can go to sleep in 1075 until expiry.

In any case, the node transmits its data packet(s) in 1080 during its allocated time window.

The transmitting phase terminates in 1090 and the node then goes to sleep.

Figure 11:
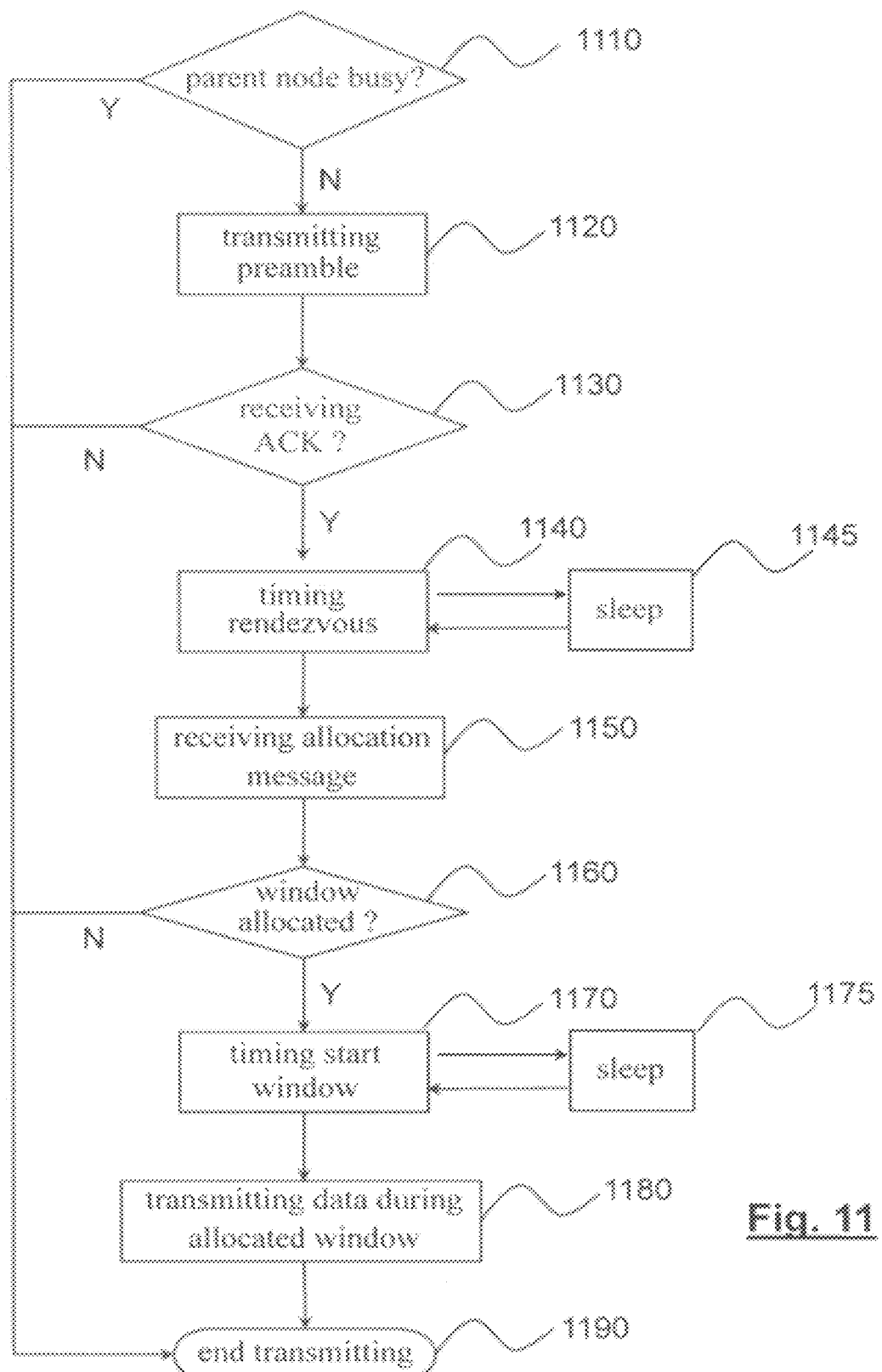
FIG. 11 represents the flowchart of an optional transmitting phase according to one alternative embodiment of the invention.

FIG. 11 represents an optional transmitting phase, implemented in an alternative embodiment of the invention.

This optional transmitting phase occurs after the receiving phase described in relation with FIG. 7. More precisely, when this phase is terminated (730), the node does not immediately go back to the sleep state but attempts to transmit the packets it has just received from its children to its parent during the current time frame.

The node listens to the channel and checks in 1110 whether its parent node is busy. To do this, it determines whether its parent node transmits messages on the channel, by discriminating the source MAC addresses of these messages.

If yes, the optional transmitting phase is immediately completed in 1190. If no, the node transmits a train of short preambles in 1120. Steps 1120 to 1190 are identical to steps 1020 to 1090 previously described.

This optional transmitting phase is a short cut. Indeed, it enables the node not to wait for the next time frame to require a time window allocation and, if successful, to retransmit packets it has just received during the receiving phase.

The communication method according to the invention enables collision risks between packets to be minimized. First, the transmission of the preamble is stopped as soon as the allocation request is acknowledged. Then, a rendezvous scheduling between a node and its children as well as the output of a single allocation message dramatically reduces the operating time of the channel. Finally, the competition between child nodes is resolved by the mechanism for allocating distinct time windows.

By reducing the collision risks and hence the probability for retransmitting a packet, the communication method according to the invention enables the energy consumption of nodes of the network to be reduced.

Moreover, the scheduling of the broadcasting of an allocation message at a rendezvous time as well as that of transmission time windows enables nodes to minimise their transmitting/receiving activity during a time frame and hence their energy consumption.

During the different phases (listening, receiving, transmitting) of the communication method set out above, a node of the network must analyse some specific messages it receives on the transmitting channel. For example, a node will be waiting for a preamble during the listening phase, for data packets during the receiving phase, and for an allocation message during the transmitting phase. The node in question can discriminate corresponding packets and refuse those not intended for it. According to one alternative, the node does not refuse but on the contrary detects packets intended for other nodes. The listening phase and then the receiving/transmitting phases will be first considered.

When a node detects a packet from its parent node during the listening phase, for example a preamble transmitted by the same, it deduces therefrom that it is busy. It can then decide to inhibit any transmitting phase (including the optional transmitting phase) during the current time frame, so as to prevent a packet collision at the parent node. It can however perform the receiving phase normally and collect packets from its child nodes.

When, during its listening phase, a node detects a preamble transmitted by a brother node (with the meaning given in the introductory part) and the subsequent acknowledgment message of their common parent node, it deduces therefrom that the parent node itself is in a listening phase. If it has packets to be transmitted, it can then take advantage of this by immediately opportunistically transmitting it a preamble, without waiting for the subsequent transmitting phase.

When, during its listening phase, a node receives a packet from one of its child nodes, other than a preamble, for example an allocation message transmitted by a child node intended to its own children, it can decide to switch to a sleep state for the rest of the time frame, once again to prevent collision risks. Alternatively, it can stop the listening phase and directly go to the transmitting phase.

When a node detects a packet of an interfering node (with the meaning defined in the introductory part) during the listening phase, it can, as previously, decide to switch to a sleep state for the rest of the time frame. However, if this choice enables energy that could be useless (collision) to be saved, it results in an increased latency in the network (transmitting phase deferred to next frame).

Now regarding the transmitting phase, if a node detects a preamble of its parent node while waiting for an acknowledgment message from the same node (because it transmits a train of short preambles to it), it deduces therefrom that the same is not in a listening phase and goes to sleep for the rest of the time frame.

If a node detects a preamble of a brother node while waiting for an acknowledgment message from its parent node, the node must arbitrate between the preamble of its brother and its own preamble. If the priority level indicated in the preamble of its brother is higher than that indicated in its own, it terminates its transmission. Conversely, it continues the transmission of short preambles, while expecting that its brother node terminates its transmission.

If a node detects an allocation message transmitted by a brother node while waiting for an acknowledgment message from its parent node, it immediately terminates any transmission until the end of the time frame.

If a node detects a preamble or an allocation message from one of its child nodes while in a receiving or transmitting phase, this preamble or this message will be quite simply ignored. However, when it is an allocation message, the node deduces therefrom that its child might soon go into transmitting phase. If the node has already undertaken its receiving phase and if it was about to go back to the sleep state, it can decide, in this case, to stay awake.

If a node detects a packet of an interfering node during a receiving or transmitting phase, it can decide, under some circumstances, in particular if the level of the interfering signal is higher than a threshold value, to terminate its reception or transmission for the rest of the time frame.

Those skilled in the art will understand that depending on the type of message detected and the phase in which the node is, further strategies can be implemented without necessarily departing from the scope of the present invention.

The invention claimed is:

1. An asynchronous communication method for a wireless sensor network, the network further comprising at least one tree structure the nodes of which include sensors and the root of which includes a collecting node, each node being adapted to receive data packets of its child nodes and to transmit them, during an allocated time window, to its parent node within said tree structure, the transmission of a packet by a node being preceded by a transmission of a preamble including a train of unit preambles, called short preambles, the communication of each node being organized according to a sequence of time frames, each time frame comprising a listening phase possibly followed by a receiving phase and/or a transmitting phase, wherein said node:
   determines during the listening phase whether a preamble is transmitted to it by one of its child nodes and, if yes, immediately sends back to the same an acknowledgment message specifying a rendezvous time;
   at the end of the listening phase, if at least one acknowledgment message has been sent, enters a receiving phase wherein it broadcasts, at the rendezvous time, a message for allocating time windows to its child nodes, and then receives, during each time window, a data packet of the child node to which its respective window has been allocated.

2. The communication method according to claim 1, wherein, if no acknowledgment message has been sent during the listening phase, a node determines whether data packets are present in its transmitting buffer and:
   if yes, transmits a preamble including a train of short preambles to its parent node;
   if no, goes to sleep for the rest of the time frame.

3. The communication method according to claim 2, wherein, after the transmission of each short preamble, the node waits for an acknowledgment message from its parent node and:
   if it receives such an acknowledgment message, immediately terminates the transmission of the train of short preambles, extracts from this acknowledgment message a time information indicating a rendezvous time and then goes to sleep until this time;
   if it does not receive any acknowledgment message at the end of the train of short preambles, goes to sleep until the end of the time frame.

4. The communication method according to claim 3, wherein at the rendezvous time, the node detects a time window allocation message originated from its parent node, determines whether this message contains its own MAC address and:
   if yes, extracts a start time information and an end time information of its allocated time window, goes to sleep until the start of this window and transmits at least a data packet stored in its transmitting buffer during this window;
   if no, goes to sleep until the end of the time frame.

5. The communication method according to claim 4, wherein, at the end of its allocated time window, the node goes to sleep until the end of the time frame.

6. The communication method according to claim 1, wherein at the end of the receiving phase, the node checks whether its parent node is busy and:
   if no, transmits to its parent node a train of short preambles and waits for an acknowledgment message from its parent node;
   if yes, goes to sleep until the end of the time frame.

7. The communication method according to claim 6, wherein if the node receives an acknowledgment message, the same:
   terminates the transmission of the train of short preambles, extracts from this acknowledgment message a time information indicating a rendezvous time and then goes to sleep until this time;
   detects, at the rendezvous time, a message for allocating time windows originated from its parent node, determines whether this message contains its own MAC address and, if yes, extracts a start time information and an end time information of its allocated time window, goes to sleep until the start of this window and transmits to its parent node at least one data packet it has received from its child nodes during the previous receiving phase.

8. The communication method according to claim 1, wherein the time window allocation at different child nodes is performed based on priority levels specified in preambles originated from the different child nodes respectively.

9. The communication method according to claim 8, wherein the priority levels are expressed in terms of class of service type, whether a child node is mobile or not, number of packets in a transmitting buffer of a child node or even oldness of the oldest packet in said transmitting buffer.

10. The communication method according to claim 3, wherein the time information specifying the rendezvous time is a counter value to be decremented with a predetermined frequency.

11. The communication method according to claim 4, wherein the start time information and the end time information of the time window allocated to the node are counter values to be decremented with a predetermined frequency.

12. The communication method according to claim 1, wherein, when a node detects a message from its parent node during the listening phase, it terminates any transmission and goes to sleep until the end of the current time frame.

13. The communication method according to claim 1, wherein, when a first node detects, during the listening phase, a preamble originated from a second node having the same parent node as the first node, said first node itself transmits a preamble, without waiting for the transmitting phase, with the proviso that packets are in standby in its transmitting buffer.

14. The communication method according to claim 1, wherein, when a node detects, during the listening phase, a packet, other than a preamble, from one of its child nodes, it switches off the listening phase and either goes to sleep until the end of the current time frame, or directly switches to the transmitting phase.

15. The communication method according to claim 1, wherein, if a node detects, during a transmitting phase, a preamble of its parent node whereas it is waiting for an acknowledgment message from the same node, it goes to sleep until the end of the current time frame.

16. The communication method according to claim 1, wherein, if a first node detects, during a transmitting phase, a preamble originated from a second node having the same parent node as the first node, said first node decides to switch off the transmission of its preamble if its priority level is lower than that of the preamble originated from the second node and continues to transmit its preamble in the opposite case.

17. The communication method according to claim 1, wherein, if a node detects a preamble or a time window allocation message, from a child node, during a receiving or transmitting phase, it does not go to sleep and waits for the transmission of a packet of this child node.

* * * * *